United States Patent

[11] 3,558,801

| [72] | Inventors | Bernd Eilhardt<br>Vinnhorst;<br>Diethart Pelz, Langenhagen, Germany |
|---|---|---|
| [21] | Appl. No. | 858,833 |
| [22] | Filed | Sept. 17, 1969 |
| [45] | Patented | Jan. 26, 1971 |
| [73] | Assignee | Kabel-und Metallwerke<br>Gutehoffnungshutte Aktiengesellschaft<br>Hannover, Germany<br>a corporation of Germany |
| [32] | Priority | Sept. 27, 1968 |
| [33] | | Germany |
| [31] | | 1,790,202 |

[54] WATERPROOF ELECTRICAL CABLE AND METHOD OF MAKING SAME
4 Claims, 2 Drawing Figs.

[52] U.S. Cl. .................................................. 174/102, 174/110, 174/113
[51] Int. Cl. .................................................. H01b 7/18
[50] Field of Search .......................................... 174/110.8, 101.5, 107, 102, 14, 10, 102

[56] References Cited
UNITED STATES PATENTS

| 1,749,008 | 3/1930 | Walker | 174/14 |
| 2,907,075 | 10/1959 | Newby | 174/110X |
| 3,315,025 | 4/1967 | Tomlinson | 174/107 |
| 3,344,228 | 9/1967 | Woodland et al. | 174/36X |

Primary Examiner—Lewis H. Myers
Assistant Examiner—A. T. Grimley
Attorney—Philip G. Hilbert ABSTRACT: A flexible waterproof electrical communications cable, having a filling disposed between the cable core and the sheath thereof; the filling being constituted of a synthetic-resin foam and which is of the open cell type; water-swellable particle matter being distributed within the cells of the foam.

PATENTED JAN 26 1971  3,558,801

INVENTORS
Bernd Eilhardt
Diethart Pelz
BY
Philip S. Hilbert
ATTORNEY

WATERPROOF ELECTRICAL CABLE AND METHOD OF MAKING SAME

BACKGROUND OF THE INVENTION

In electrical cables it is important that the penetration of moisture into such cable after it has been laid down be avoided entirely or at least such penetration be limited to small axial portions of the cable. This is particularly applicable to communications cables whose cable cores consist of conductors with moisture-sensitive paper insulation, as well as spaces and cavities in the core or between the core and sheath.

In such cables, water penetrating the same at a particular point in the cable, may spread axially of the cable and become known after an extended time period, as indicated by a showing of ground potential due to a specific fault at a given point in the cable, or a short circuit when the water reaches a dividing or splicing box. By this time, a relatively long section of cable is water affected and such section must be replaced, since it is no longer possible to effect a short sleeve repair.

To prevent the longitudinal migration of water in communications cables, it has been suggested that a synthetic-resin foam be formed in situ in and about the cable core; the resultant foam being of a waterproof character. However, such known cable constructions show substantial stiffness after the foaming operation is completed. When attempts were made to modify the foam by way of its constituents, mixing and the like, to achieve desired flexibility in the finished cable, it was found that the waterproofing properties thereof were either entirely lost or materially reduced.

It has also been suggested that water-swellable material be applied about the cable core for swelling on initial contact by water; the swollen material plugging leaks and cavities to prevent longitudinal movement of water relative to the core. However, such swellable material, e.g. wood fiber and the like tends to shift so that with movements of the cable and the laying down thereof, the material lumps so that it can only swell on its outer surface; or is so poorly distributed over the length of the cable as to make the waterproofing thereof nonuniform.

Accordingly, an object of this invention is to provide an improved electrical cable construction having waterproofing in the form of an open-cell synthetic-resin foam filling cavities in the cable core and disposed between the core and sheath, water-swellable particle matter being distributed in the cells of the foam, whereby to waterproof the cable against moisture moving axially of the cable, yet preserving the flexibility of the cable as a whole.

Another object of this invention is to provide an improved communications cable of the character described, wherein water-swellable material is uniformly distributed along the length of a cable core, such material being retained against longitudinal movement so as to provide uniform waterproofing properties along the length of the cable.

A further object of this invention is to provide an improved method of making the cable of the character described, wherein the foam is formed and applied to the cable as the same is being made; the water-swellable material being admixed with one of the constituents of the foam.

Other objects of this invention will in part be obvious and in part hereinafter pointed out.

DESCRIPTION OF THE PREFERRED EMBODIMENTS

Figure 1:
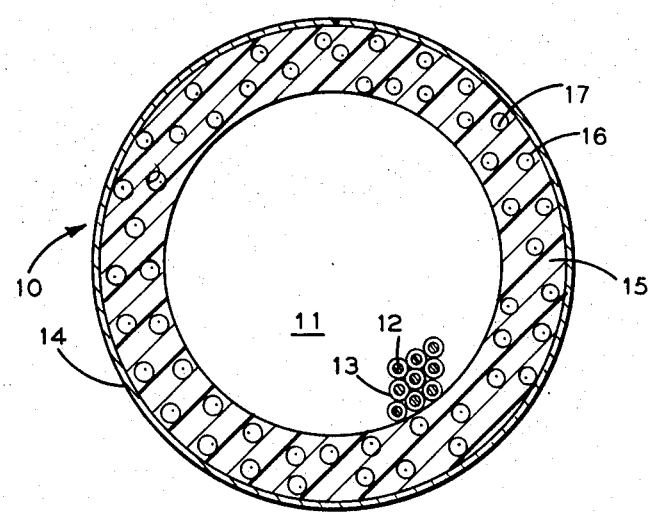
FIG. 1 is a transverse sectional view of an electrical cable embodying the invention.

As shown in FIG. 1, 10 designates a cable embodying the invention. The same comprises a core 11 made up of the usual conductors 12, insulation 13 and filler portions, where necessary. The core 11 is enclosed in a sheath 14 which may be of thin metal. Between the core 11 and sheath is located an open-cell synthetic-resin foam 15 having open cells indicated at 16. Within cells 16 are water-swellable particles 17 which may be of cellulose, methyl cellulose, carboxymethyl cellulose, or the like.

It will be apparent that the water-swellable material 17 is uniformly distributed along the length of the cable 10 by way of foam 15. With any ingress of water through sheath 14, the particles 17 will immediately swell and fill the cells 16. Thus, further movement of water longitudinally of the cable is effectively stopped. Yet, the normal flexibility of the cable 10 is retained due to the conventional formulation of the preferred foam which is a standard polyurethane made up of the usual combination of isocyanate and polyols.

Figure 2:
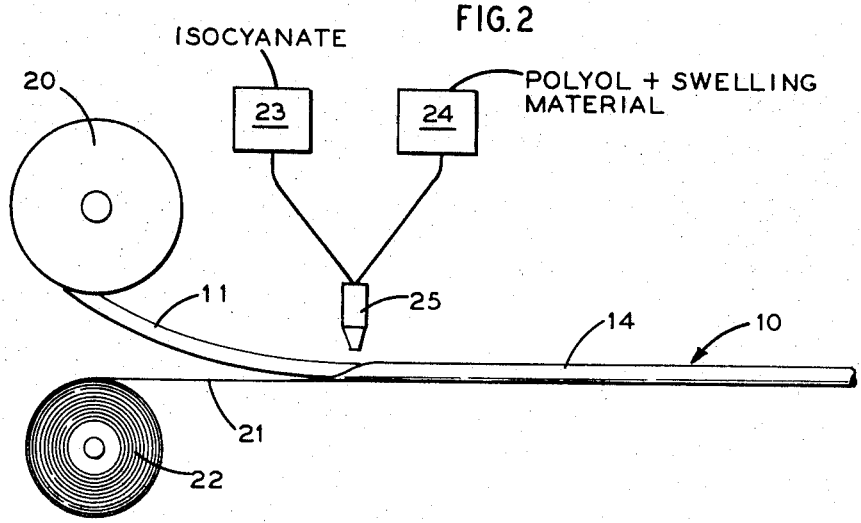
FIG. 2 is a diagrammatic view showing a method of forming the cable.

As shown in FIG. 2, the cable 10 may be formed by moving cable core 10 from its supply reel 20, in a longitudinal path, concomitantly with metal tape 21 drawn from a supply reel 22, which tape is folded about core 11 to form sheath 14. Immediately before sheath 14 is fully closed, the foram 15 is formed in situ by combining isocyanate from supply tank 23 with polyol from supply tank 24, delivering the mixture by way of nozzle 25 for distribution between core 11 and sheath 14.

Preferably, the water-swellable particle matter 17 is premixed with the nonaqueous constituent of foam 15, i.e. the polyol in tank 24. The mixture issuing from nozzle 25 foams in place to form layer 15 in cable 10; the particles 17 being disposed in the open cells 16 of said foam 15.

To make foam 15, one part of isocyanate is mixed with from one to three parts, preferably two parts, of polyol. The isocyanate and polyol constituents of polyurethane are well known in the art, together with the usual catalyst, additives and the like. The particle matter 17 is provided in suitable amounts, which may be of the order of from 10 percent to 20 percent, preferably 15percent, by weight based on the polyol constituent, such matter being cellulose, or methyl cellulose, or carboxymethyl cellulose.

Also, the foam layer 15 may be derived from preformed polyurethane foam in the form of shavings, pieces of relatively small size and the like. The finely divided particle material 17 is thoroughly mixed with the polyurethane pieces or shavings to fill the cells thereof with such particles. Here again, the open cells of the polyurethane-particle mixture introduced between core and sheath 14, will admit water initially to swell said particles and thus fill the cells 17, to thereby effectively seal the cable 10 against movement of water longitudinally thereof.

It is understood that the open cells 16 of the foam 15 in cable 10, allow the use of gas under pressure for monitoring the cable.

We claim:

1. An electrical cable comprising a core, a sheath enclosing said core, and a flexible filling disposed between said core and said sheath, said filling comprising flexible synthetic-resin foam having open cells, and water-swellable particle matter uniformly distributed through said foam within the cells thereof.

2. A cable as in claim 1 wherein said swellable particle matter is cellulose.

3. A cable as in claim 1 wherein said swellable particle matter is methyl cellulose.

4. A cable as in claim 1 wherein said synthetic-resin foam comprises pieces of open-cell polyurethane foam, the water-swellable particles being smaller than the cells of said foam and disposed therein.